(12) United States Patent
Qiu et al.

(10) Patent No.: US 8,300,579 B2
(45) Date of Patent: Oct. 30, 2012

(54) METHOD FOR IMPROVING REVERSE GAIN

(75) Inventors: Gang Qiu, Shenzhen (CN); Dongling Wu, Shenzhen (CN); Qinji Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 356 days.

(21) Appl. No.: 12/676,240

(22) PCT Filed: Nov. 5, 2007

(86) PCT No.: PCT/CN2007/003126
§ 371 (c)(1),
(2), (4) Date: Mar. 3, 2010

(87) PCT Pub. No.: WO2009/030077
PCT Pub. Date: Mar. 12, 2009

(65) Prior Publication Data
US 2010/0172300 A1 Jul. 8, 2010

(30) Foreign Application Priority Data
Sep. 6, 2007 (CN) .......................... 2007 1 0149838

(51) Int. Cl.
H04W 4/00 (2009.01)
(52) U.S. Cl. ..................................... 370/328; 455/426.1
(58) Field of Classification Search .................. None
See application file for complete search history.

(56) References Cited

U.S. PATENT DOCUMENTS

| | | | |
|---|---|---|---|
| 5,548,812 | A | 8/1996 | Padovani et al. |
| 5,722,044 | A | 2/1998 | Padovani et al. |
| 2004/0219876 | A1 | 11/2004 | Baker |
| 2005/0272432 | A1 | 12/2005 | Ji et al. |
| 2007/0086468 | A1* | 4/2007 | Hosein et al. ............. 370/395.4 |
| 2010/0172300 | A1* | 7/2010 | Qiu et al. ..................... 370/328 |

FOREIGN PATENT DOCUMENTS

| | | |
|---|---|---|
| CN | 1130975 A | 9/1996 |
| CN | 1994017 A | 7/2007 |
| CN | 101026444 A | 8/2007 |
| KR | 100443111 B1 | 7/2004 |
| KR | 20070058045 A | 6/2007 |
| WO | 2004054133 A1 | 6/2004 |
| WO | 2006070755 A1 | 7/2006 |
| WO | 2007020996 A1 | 2/2007 |

OTHER PUBLICATIONS

International Search Report in international application No. PCT/CN2007/003126, mailed Jun. 26, 2008.

* cited by examiner

Primary Examiner — Jianye Wu
(74) Attorney, Agent, or Firm — Schiff Hardin LLP

(57) ABSTRACT

A method for improving reverse coverage is disclosed, comprising: A, when a base station requests a terminal to enable the reverse repetition, under the condition that the service quality requirement and the transmission speed of the terminal are persistent, then step B is executed; B, if the reverse gain still cannot be improved after repetition, the reverse repetition will not be enabled; or, the reverse repetition will be enabled. The method of the present invention can take account of subchannelization gain, repetition gain and the interaction of both as an integration, to ensure that the whole gain of reverse link increases after the enabled repetition, and to prevent the system from sacrificing the bandwidth without improving but deteriorating the reverse coverage capability in certain circumstances after the enabled repetition occurs.

17 Claims, 7 Drawing Sheets

Fig. 4 (a)

| Rng1 | Duration | Rng2 | Duration | Duration |
|---|---|---|---|---|
| FFB | Duration | | | |

Fig. 4 (b)

| Rng1 | Duration | Rng2 | Duration | Duration |
|---|---|---|---|---|
| FFB | | Duration | | |

METHOD FOR IMPROVING REVERSE GAIN

TECHNICAL FIELD

The present invention relates to the field of radio communications, especially to a method for improving reverse gain.

BACKGROUND

In recent years, Orthogonal Frequency Division Multiplexing (OFDM) technique has become a mainstream technique of radio communication physical layer technology because of its effective counteract multipath interference and narrowband interference and high frequency spectrum efficiency, while the technique of Orthogonal Frequency Division Multiple Access (OFDMA)+Multiple Input Multiple Output (MIMO) has the natural technical advantages compared with the $3^{rd}$ generation Code Division Multiple Access (CDMA), and is more applicable for broadband mobile communication system, and thus is generally acknowledged to be one of the core techniques of the next generation mobile communication system. Worldwide Interoperability for Microwave Access (WiMAX) which adopts OFDMA is the core technique of physical layer and takes account of WiMAX 802.16e standard with both mobility and broadband characteristics, and it is a powerful competitor for the next generation mobile communication standards.

In an OFDMA system, the time domain is divided into a plurality of OFDM symbols, while the frequency domain is divided into a plurality of subchannels and each subchannel is an assemble of a group of sub-carriers. Usually a time-frequency zone crossly constituted by a subchannel and one or more symbols is called a slot, which is the smallest distribution unit in an OFDMA system. So the physical layer resource of an OFDMA frame can be logically denoted by a two-dimensional rectangular table composed of slots and subchannels. As shown in FIG. 1, each grid is a slot, and the physical layer resource allocated for the terminal is a resource block with slot as the unit, and the resource block is usually similar to a rectangular block (e.g. IEEE 802.16e), which is a kind of two-dimensional time-frequency structure.

The time-frequency two-dimensional resource brings various benefits to the OFDMA system, and one of the peculiar advantages is that the terminal reversion has subchannelization gain, which can improve the reverse gain of an OFDMA terminal. As shown in FIG. 2, taking the reverse frame structure of WiMax IEEE802.16e system Fast Fourier Transformation (FFT) 1024-point under the Partial Usage of Subchannels (PUSC) mode for example, the present invention illustrates the concept of subchannelization gain: with 35 subchannels in total, the transmit power of a Mobile Station (MS) which is also called a terminal (suppose that the maximum power $P_{max}$ is 23 dBm) can be completely distributed to subchannels that are in practical use, and an extreme case is that $P_{max}$ (23 dBm) is completely distributed to one subchannel (the maximum transmit power of each sub-carrier is 9 dBm), and there is a gain of 15.4 dB compared with the situation when a MS occupies all the 35 uplink subchannels. The WiMax IEEE802.16e system can support both reverse subchannelization and repetition at the same time, and when the transmit power of the terminal reaches the maximum transmit power $P_{max}$, the integrated gain after the process of subchannelization and then repetition is not necessarily equal to the sum of the two gains directly, and the integrated gain may even be less than the gain after using only subchannelization under certain particular circumstances, leading to a sudden deterioration of reverse coverage. Two scenarios will be illustrated hereinafter:

as shown in FIG. 2, suppose that the PUSC mode is adopted, Time Division Duplex (TDD) is 2:1, the proportion of uplink symbol number to downlink symbol number is DL:UL=31:15, each uplink subchannel actually occupies a width of 5 slots, including data and overhead channels; ideal repetition gains for 2, 4 and 6 times of repetition each are 3 dB, 6 dB and 7.8 dB respectively; one-subchannelization gains in terms of 2, 4 and 6 subchannels each are 3 dB, 6 dB and 7.8 dB respectively.

Scenario 1:

when a terminal user is successfully accessed, the service occupies exactly one whole subchannel (4 slots), the user moves from a near point to a distant point until the power reaches $P_{max}$(23 dBm/QPSK), meanwhile, suppose that the terminal continues to move away from the base station, if repetition is activated, for 2 times, the terminal will occupy 2 subchannels, and the gain brought by repetition will be 3 dB under the ideal condition; meanwhile, however, the power of each subchannel will decrease 3 dB, and the transmit power of each subchannel will be 20 dB, so the gain of each subchannel may decrease 3 dB because of the power reduction, therefore, the integrated gain is 0 dB. In other words, it appears that the repetition brings no gain under such a condition. In the same way, 4 times or 6 times of repetition brings no gain either.

Scenario 2:

when a terminal user is successfully accessed, the service occupies exactly the first slot of a subchannel, this user moves from a near point to a distant point until the power reaches $P_{max}$ (23 dbm/QPSK), wherein, suppose that this terminal will continue to move away from the base station, if repetition is activated, for 2 times, the terminal will occupy 2 slots, and the gain brought by repetition will be 3 dB under the ideal condition; thereby, the terminal will occupy 2 slots because of the two repetitions, but still occupy 1 subchannel, the power of which is $P_{max}$ (23 dbm), therefore, the integrated gain brought by the repetition is 3 dB, in the same way, for 4 times of repetition the terminal also occupies 1 subchannel, with an integrated gain of 6 dB; but for 6 times of repetition, the terminal will occupy 2 subchannels, and a gain loss of 3 dB will be brought by the power reduction, so the integrated gain is 7.8−3=4.8 dB.

It can be seen from the description of scenario 1 and scenario 2 that, under the condition that the transmit power of the terminal is limited, the effect of enabled repetition gets worse under certain particular circumstances.

SUMMARY

Considering the disadvantages mentioned above, the present invention aims to solve the technical problem by providing a method for improving reverse gain, wherein the base station determines whether repetition can be enabled for a terminal as well as the number of repetition times $N_{repetition}$, so as to solve the problem that the overall reverse gain gets worse when the reverse subchannelization gain and repetition are enabled at the same time, leading to improve reverse coverage ability of the terminal.

In order to solve the technical problem mentioned above, the present invention provides a method for improving reverse coverage, wherein, comprising:

A. when a base station requests a terminal to enable reverse repetition, under the condition that the service quality requirement and the transmission speed of the terminal are persistent, step B is executed; and B. if the reverse gain still cannot be improved after repetition, the reverse repetition will not be enabled; otherwise, the reverse repetition will be enabled.

Further, the step B may comprise specifically:

calculating the gain of the enabled reverse repetition $Gain_{N\_repetition}$ and the power loss of each subchannel $PowerLoss_{subchannel}$ brought by the enabled reverse repetition respectively, when the gain of the enabled reverse repetition $Gain_{N\_repetition}$ is larger than the power loss of each subchannel $PowerLoss_{subchannel}$ brought by the enabled reverse repetition, the reverse repetition is enabled, otherwise, the reverse repetition is not enabled.

Further, the step B may comprise specifically:

if the reverse gain still cannot be improved after repeating the maximum repetition times, then the reverse repetition is not enabled; otherwise the base station may determine the minimum repetition times after which the reverse gain can be improved, and notify the terminal to repeat for the repetition times before transmitting reversely.

Further, the step B may comprise specifically:

B1. set the initial value of repetition times $N_{repetition}$ to be 2;

B2. the base station may determine the power gain loss of each subchannel $PowerLoss_{subchannel}$ after $N_{repetition}$ times of repetition, as well as the acquired gain $Gain_{N\_repetition}$ after $N_{repetition}$ times of repetition;

B3. the base station may determine the difference value $Delta_{cinr}$ between the target carrier-to-interference-and-noise ration (CINR) and the current measured CINR;

B4. if $Gain_{N\_repetition} \geq PowerLoss_{subchannel} + Delta_{cinr}$, the base station may notify the terminal to repeat for $N_{repetition}$ times before transmitting reversely; and otherwise, the base station may judge whether $N_{repetition}$ is less than the maximum repetition times, and $N_{repetition}$ is increased if it is less than the maximum repetition times and then repeat the steps B2 to B4; otherwise, the reverse repetition is not enabled.

Further, wherein:

$$PowerLoss_{subchannel} = 10 \log_{10}(N\_Subchannel_{repetition}/N\_Subchannel_{Pre\_repetition})$$

wherein, $N\_Subchannel_{Pre\_repetition}$ is the number of subchannels occupied by the terminal before $N_{repetition}$ times of repetition, while $N\_Subchannel_{repetition}$ is the number of subchannels occupied by the terminal after $N_{repetition}$ times of repetition.

Further, $Gain_{N\_repetition} = 10 \log_{10}^{N_{repetition}}$.

Further, $Delta_{cinr} = CINR_{Target} - CINR_{temp}$.

Further, $N\_Subchannel_{Pre\_repetition}$ is the number of subchannels allocated for the terminal in the previous nearest frame; $N\_Subchannel_{repetition}$ is the number of subchannels occupied by the bandwidth that the terminal currently requires after $N_{repetition}$ times of repetition.

Further, the $N\_Subchannel_{Pre\_repetition}$ may be determined by the following ways according to different situations respectively:

(91). when numbers of slots of each subchannel in the uplink subframe are the same after disregarding the overhead channel:

$$N\_Subchannel_{Pre\_repetition} = Ceil\left[\frac{BW_{Pre\_repetition}}{T_{slot\_per\_subchannel}}\right]$$

wherein, $T_{slot\_per\_subchannel}$ is the number of total available uplink slots of each subchannel;

$BW_{Pre\_repetition}$ is the total reverse bandwidth allocated by the base station for the terminal, $BW_{Pre\_repetition}$ is the total reverse bandwidth of the last frame which is the nearest to the current frame;

Ceil[ ] is to round up; and (92). when numbers of slots of each subchannel in the uplink subframe are not all the same after disregarding the overhead channel:

$N\_Subchannel_{Pre\_repetition}$ is the maximum number of subchannels occupied by the terminal of any slot in the previous subframe which is the nearest to the current frame.

Further, the $N\_Subchannel_{repetition}$ may be determined by the following ways according to different situations respectively:

(101). when numbers of slots of each subchannel in the uplink subframe are the same after disregarding the overhead channel:

$$N\_Subchannel_{repetition} = Ceil\left[\frac{BW_{repetition}}{T_{slot\_per\_subchannel}}\right]$$

wherein, $T_{slot\_per\_subchannel}$ is the number of total available uplink slots of each subchannel;

$BW_{repetition}$ is the number of reverse general bandwidth slots occupied by the terminal after $N_{repetition}$ times of repetition;

Ceil[ ] is to round up; and (102). when numbers of slots of each subchannel in the uplink subframe are not all the same after disregarding the overhead channel, if the number of available slots is less than the number of needed slots after repetition, the reverse repetition is not enabled; otherwise, $N\_Subchannel_{repetition}$ is the maximum number of subchannels occupied by the terminal of any slot in the uplink subframe.

Further, in the step B, when the reverse repetition is not enabled, step C may be executed:

C. the base station may notify the terminal to repeat while maintaining the number of subchannels occupied by the terminal before transmitting reversely, or to reduce the number of subchannels occupied by the terminal and increase the transmit power of each subchannel before transmitting reversely.

Further, the step A may comprise specifically:

A1. when the CINR demand cannot be met even if the terminal's reverse transmit power reaches the adjustable maximum value $P_{max}$, step A2 may be executed;

A2. the base station judges whether the CINR demand can be met under the current distribution condition firstly: under the condition that the terminal service quality requirement and the transmission speed are consistent, and after confirming that the terminal's demand for transmission channel is satisfied, the base station determines the power gain change at every subchannel;

if the terminal's demand for transmission channel is not satisfied, the step C is executed;

if the CINR demand can be met after the subchannel power gain is changed, the repetition is not enabled, the repetition times $N_{repetition}$ is set to be 1 and then the terminal is notified to reversely transmit accordingly; and otherwise, if the CINR demand cannot be met after the subchannel power gain is changed, repetition is enabled, and the step B may be called.

The method of the present invention can take account of subchannelization gain, repetition gain and the interaction of both as an integration, to ensure that the whole gain of reverse link increases after the enabled repetition, and to prevent the system from sacrificing the bandwidth without improving but deteriorating the reverse coverage ability in certain circumstances after the enabled repetition occurs.

BRIEF DESCRIPTION OF THE DRAWINGS

FIGS. 4 (a) and (b) are diagrams illustrating how overhead slot position can impact the number of subchannels occupied by a user;

DETAILED DESCRIPTION

Figure 1:
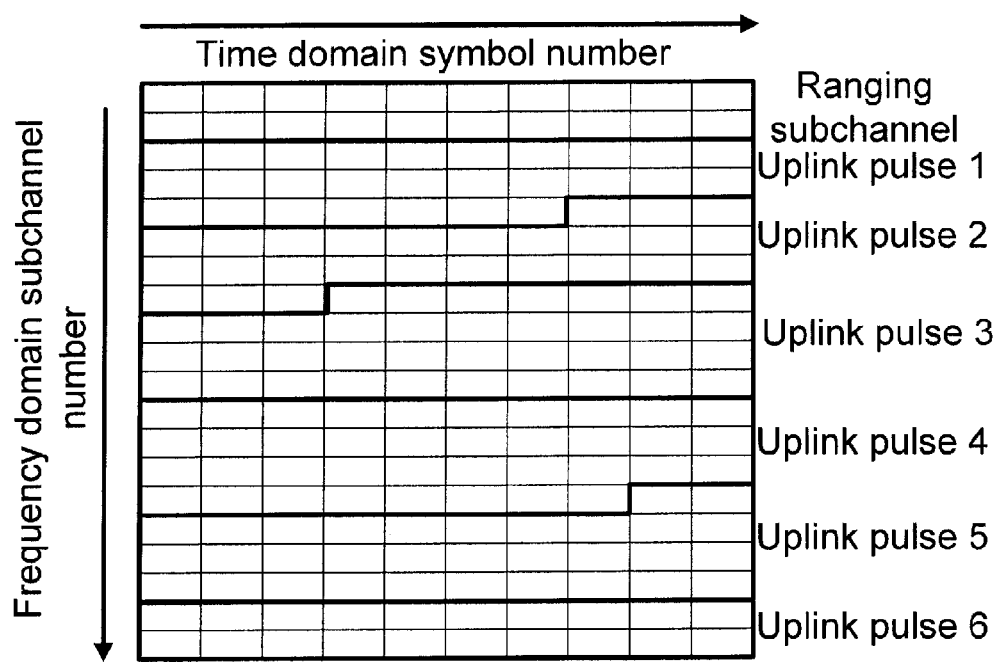
FIG. 1 is a diagram illustrating the logical structure of an uplink OFDMA frame in the existing technology.
Figure 2:
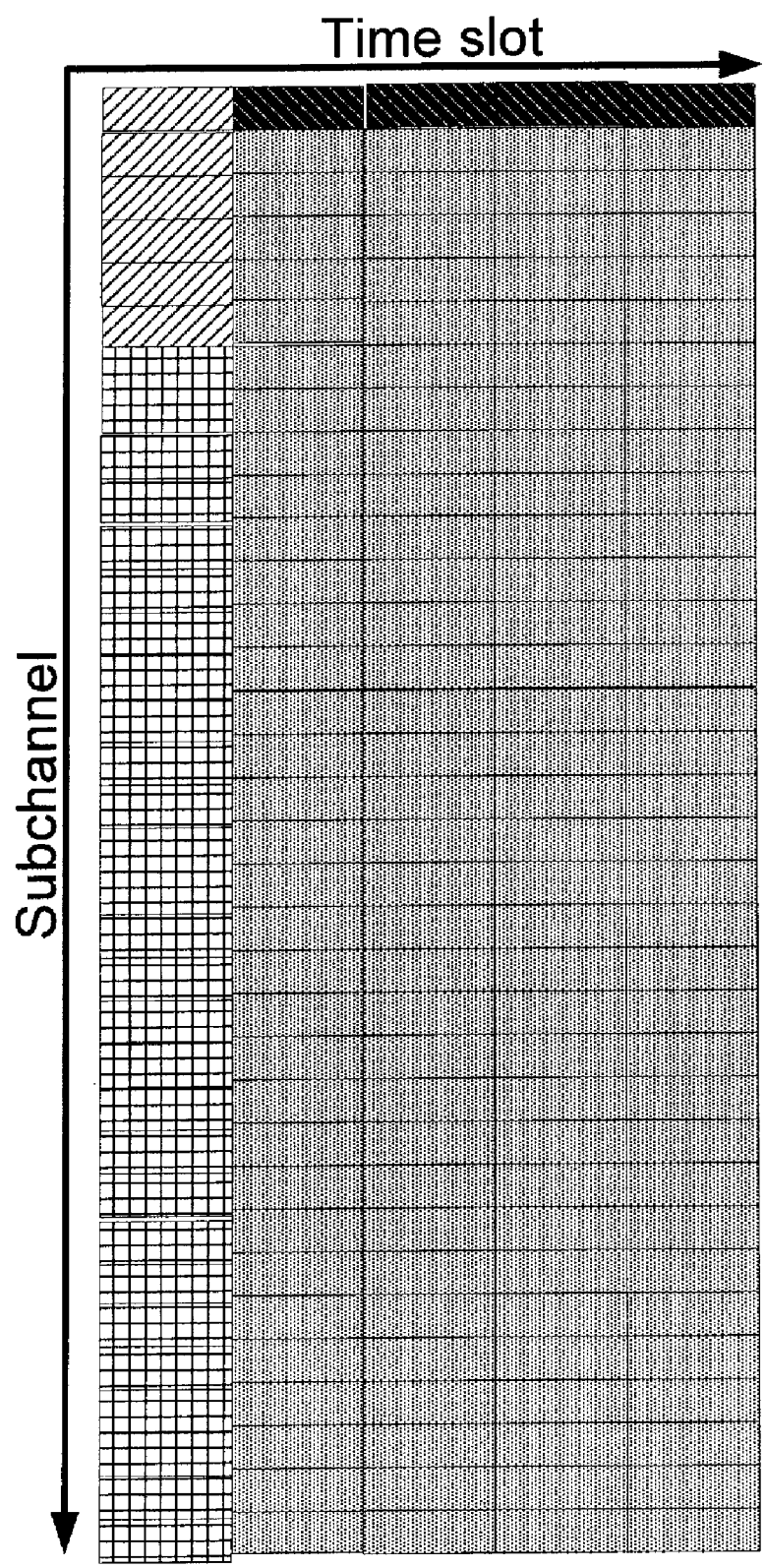
FIG. 2 is a diagram illustrating the reverse subchannelization gain in WiMax IEEE802.16e in the existing technology.

The technical scheme of the present invention will be further described in detail with reference to the drawings and embodiments hereinafter.

The method for improving reverse gain provided by the present invention can prevent the contradiction between reverse subchannelization and repetition gain in an OFDM system, and the key idea of the method is: under the condition that the Quality of Service (Qos) and the transmission speed of a terminal user are consistent, when the enabled reverse repetition gain is larger than the power loss at each subchannel brought by the enabled reverse repetition, reverse repetition is enabled, otherwise reverse gain is increased at the cost of sacrificing terminal transmission speed.

The method comprises the following steps:

A. the base station determines whether it is needed to enable repetition under the condition that the Qos requirement and the transmission speed of the terminal user are maintained, if it is not needed to enable repetition, notify the terminal that repetition is not to be enabled. Under the condition that enabled repetition is needed, it is further judged whether to enable reverse repetition, if the number of available slots is smaller than that of slots needed after repetition, or if the reverse gain has still not been improved after $N_{repetition}$ times of repetition, reverse repetition is not enabled under the condition that the Qos requirement and the transmission speed of the terminal are maintained, and then step B is proceeded; and if reverse repetition is enabled under the condition that the Qos requirement and the transmission speed of the terminal are maintained, the base station determines the minimum times of repetition for improving reverse gain and notifies the terminal, the terminal repeats for a fixed times of repetition and transmits reversely, so as to improve reverse coverage. The working method of repetition under the condition that the Qos requirement and the transmission speed of the terminal are maintained is called method 1.

B. the base station selects method 2 or method 3 and notifies the terminal to transmit reversely by the selected method, so as to increase reverse coverage gain. In practical applications, the selection is proceeded according to the strategy specified by the manufacturer, such as selecting a method with low interference; usually method 2 is a preferable choice.

Method 2, enable repetition under the condition that the number of subchannels occupied by the terminal is maintained, the transmission speed of the terminal turns to be $1/N_{repetition}$ of that before the repetition, repetition times are determined according to the difference value between the practical CINR and the target CINR, so that the reverse gain after repetition is larger than or equal to the difference value between the practical CINR and the target CINR; for example, if the current practical measured CINR=4 dB, the target CINR=6 dB, and the gain of the two repetitions is 3 dB, then the terminal transmits reversely after the two repetitions.

Method 3, increase the transmit power of each subchannel (sub-carrier) under the condition that the number of subchannels occupied by the terminal decreases; the method of gradually reducing subchannels is adopted, for example, if the initial number of occupied subchannels is 3, then the number is reduced to 2, and all the power is concentrated to the two subchannels and is then transmitted, by this method if the CINR demand can be met, otherwise, the number of subchannels has to be further reduced.

Figure 3:
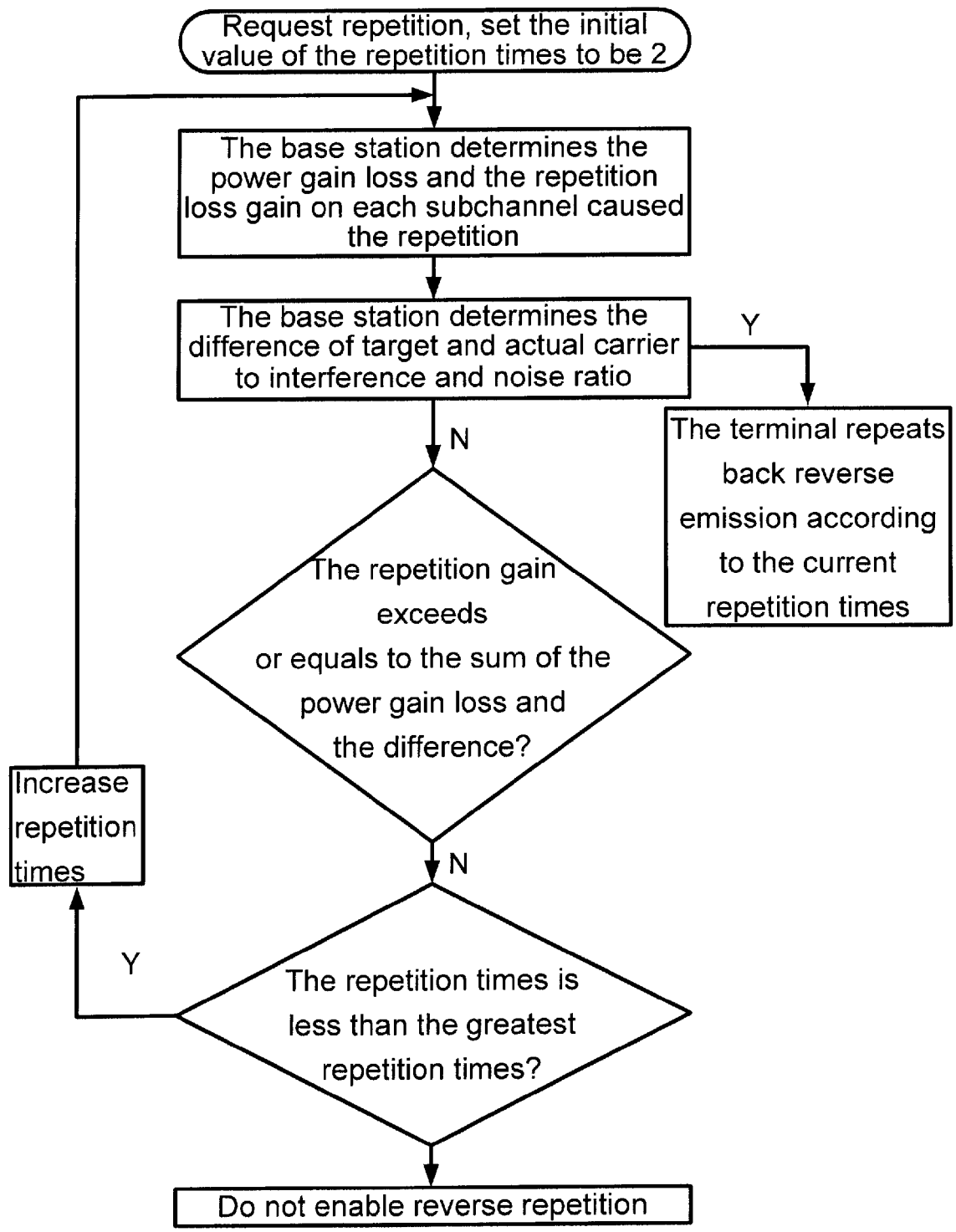
FIG. 3 is a flowchart illustrating the specific process of a method for improving reverse gain of the present invention.

As shown in FIG. 3, the step A may but not be limited to comprise the following steps:

A1. when the base station needs the terminal to enable repetition, under the condition that the Qos requirement and the transmission speed of the terminal are maintained, the base station further judges whether to enable reverse repetition. Set the initial value of repetition times $N_{repetition}$ to be 2, and then step A2 is executed.

The judgment about "the base station needs the terminal to enable repetition" in the step A1 comprises:

(1) when the carrier-to-interference-and-noise ration (CINR) demand cannot be met even if the reverse transmit power of the terminal reaches the terminal's adjustable maximum value $P_{max}$, turn to step (2).

(2) because the slot allocated for the terminal by the base station is not fixed according to the current condition, the base station judges whether the CINR demand can be met under the current allocation condition firstly, and after it is confirmed that the terminal's requirement for transmission channel is satisfied, determines the power gain change at each subchannel. Step (2) can also be omitted in practical application, only keeping the judgment in step (1).

If the terminal's requirement for transmission channel is not satisfied, the step B is executed directly.

If the CINR demand can be met after the subchannel power gain is changed, there is no need to repeat, the repetition times $N_{repetition}$ is set to be 1 and the terminal is notified to transmit reversely in accordance.

Otherwise, if the CINR demand still cannot be met after the subchannel power gain is changed, repetition is needed.

A2. the base station determines the power gain loss PowerLoss$_{subchannel}$ (dB) of each subchannel brought by $N_{repetition}$ times of repetition, as well as the gain Gain$_{N\_repetition}$ obtained after $N_{repetition}$ times of repetition.

Wherein, PowerLoss$_{subchannel}$ and Gain$_{N\_repetition}$ are determined by the following way.

Gain$_{N\_repetition}$=10 log$_{10}^{N_{repetition}}$ under ideal conditions; as to a practical system, Gain$_{N\_repetition}$ can be determined according to simulated or measured results.

Under ideal conditions, the power gain loss PowerLoss$_{subchannel}$ of each subchannel brought by $N_{repetition}$ times of repetition is:

PowerLoss$_{subchannel}$=10 log$_{10}$(N_Subchannel$_{repetition}$/N_Subchannel$_{Pre\_repetition}$)

wherein, $N\_Subchannel_{pre\_repetition}$ is the number of subchannels occupied by the terminal when repetition is not enabled, while $N\_Subchannel_{repetition}$ is the number of subchannels occupied by the terminal after $N_{repetition}$ times of repetition; further, $N\_Subchannel_{Pre\_repetition}$ is the number of subchannels occupied by the terminal in the previous nearest frame, and data of the subchannels in the previous nearest frame are taken as the computation basis; $N\_Subchannel_{repetition}$ is the number of subchannels occupied by the terminal's current required bandwidth after $N_{repetition}$ times of repetition, and the number of subchannels occupied by the terminal upon current allocation is taken as the computation basis. As to a practical system, $PowerLoss_{subchannel}$ can be determined by way of simulation or measurement according to the result of $N\_Subchannel_{repetition}/N\_Subchannel_{Pre\_repetition}$.

A3. the base station determines the difference value $Delta_{cinr}$ between the target DINR and the current measured CINR;

$$Delta_{cinr}=CINR_{Target}-CINR_{temp}$$

$CINR_{Target}$ is the target CINR, which can be regulated according to various modulation coding thresholds or computed by power control algorithm on the basis of the existing technique.

$CINR_{temp}$ is the actual uplink signal-to-noise ratio at the terminal.

Step A2 and A3 are not in particular order; in addition, step A4 is introduced for meticulous judgment, and step A3 is not needed in case of coarse judgment.

A4. according to the results in step A2 and/or step A3, the base station judges whether to enable repetition under the condition that the Qos requirement and the transmission speed of the terminal are maintained and how many times of repetition should be performed if repetition is to be enabled according to the following judging terms:

for meticulous judgment, if $Gain_{N\_repetition} \geq PowerLoss_{subchannel}+Delta_{cinr}$ is satisfied, the terminal then repeats for certain times thereafter that are obtained according to the current method of repetition computation every time, namely the terminal transmits reversely after $N_{repetition}$ times of repetition, until it is disconnected from the base station, such that the Qos requirement and the transmission speed of the terminal can be maintained; if the above condition is not satisfied, it is judged whether $N_{repetition}$ is less than the maximum repetition times; the maximum repetition times can be the times regulated in the protocol, such as 6 times in the IEEE802.16e protocol, repetition is not enabled if $N_{repetition}$ is no less than the maximum repetition times, and then step B is executed; otherwise, the steps A2 to A4 are repeated after $N_{repetition}$ is added up, and the adding up extent can be determined to be 1 or 2 or other values, according to practical situations. In other words, $N_{repetition}$ is selected according to repetition times from low to high, say 2, 4, 6 and so on incrementally, under the condition that the Qos requirement and the transmission speed of the terminal are maintained, if the CINR demand can be met and the reverse gain can be improved after two repetitions, the terminal repeats for 2 times before transmission; if the CINR demand cannot be met after two times of repetitions, it is proceeded to verify whether 4 times of repetition can meet the CINR demand, in the same way, if the reverse gain still cannot be improved until the CINR demand is met after verifying for the maximum repetition times, the repetition is not enabled.

For coarse judgment, the judging term is $Gain_{N\_repetition} \geq PowerLoss_{subchannel}$ and the rest process is the same as that for meticulous judgment.

In the step A2, the method for determining $N\_Subchannel_{Pre\_repetition}$ and $N\_Subchannel_{repetition}$ is as follows:

because the number of subchannels is related to the overhead slot position, as shown in FIG. 4, even though a certain terminal has the requirement of time-frequency resources, if the overhead slot is located differently, the number of practically occupied subchannels in a physical frame is different, and most importantly, the maximum number of subchannels within the same symbol time is different. As to different kinds of overhead slot positions, $N\_Subchannel_{Pre\_repetition}$ can be determined according to but is not limited to the following manners:

a1) when every subchannel in an uplink subframe has the same number of slots after disregarding the overhead channel:

$$N\_Subchannel_{Pre\_repetition} = Ceil\left[\frac{BW_{Pre\_repetition}}{T_{slot\_per\_subchannel}}\right]$$

$T_{slot\_per\_subchannel}$ is the number of available uplink slots in each subchannel;

$BW_{Pre\_repetition}$ is the reverse general bandwidth slot allocated for the MS by the base station, with number of slots as the unit. Since the bandwidth allocated by the base station is not constant, $BW_{Pre\_repetition}$ can be set to be the general reverse bandwidth of the MS allocated by the base station in the previous frame which is the nearest to the current frame; and in that case, the number of subchannels denotes the maximum number of subchannels overlapped in the same symbol or slot.

Ceil[ ] is to round up the result in "[ ]", i.e. Ceil[1.6]=2.

b1) after disregarding the overhead channel, when not all subchannels comprise the same number of slots in the uplink subframe, $N\_Subchannel_{Pre\_repetition}$ can be obtained by the following way:

$Pos_{ij}$ indicates whether $Slot(i,j)$ is occupied, being 0 if $Slot(i,j)$ is occupied; otherwise being 1, indicating that $Slot(i,j)$ is available; $i \in [1 \ldots m]$, $j \in [1 \ldots n]$; wherein m is the number of slots comprised in the uplink subframe, n is the number of subchannels comprised in the uplink subframe, so the uplink subframe is defined as a resource block composed by n subchannels multiply the number of symbols comprised in the m slots.

$N\_Subchannel_{Pre\_repetition}(i)$ denotes the number of subchannels occupied by this terminal in the $i^{th}$ slot in the previous subframe which is the nearest to the current frame, i.e.:

$$N\_Subchannel_{Pre\_repetition}(i) = \sum_j Pos_{ij}.$$

And $N\_Subchannel_{Pre\_repetition}$ is the maximum number of subchannels occupied by the terminal in any slot in the previous subframe which is nearest to the current frame, i.e.: $N\_Subchannel_{Pre\_repetition}=Max\{N\_Subchannel_{Pre\_repetition}(i)\}$.

In the step A2, the method for determining $N\_Subchannel_{repetition}$ is similar to that for determining $N\_Subchannel_{Pre\_repetition}$ after the repetition, the number of subchannels occupied by the terminal is related to the position of the current overhead slot, but it is not limited to determine $N\_Subchannel_{repetition}$ by the following way:

a2) after disregarding of the overhead channel, when every subchannel in the uplink subframe has the same number of slots:

$$N\_Subchannel_{repetition} = Ceil\left[\frac{BW_{repetition}}{T_{slot\_per\_subchannel}}\right]$$

$BW_{repetition}$ is the number of slots after $N_{repetition}$ times of repetition according to the reverse general bandwidth allocated for the terminal accordingly; and in that case, the number of subchannels is the maximum number of subchannels overlapped in the same symbol or slot.

b2) after disregarding of the overhead channel, when not all subchannels in the uplink subframe comprises the same number of slots, $N\_Subchannel_{repetition}$ can be obtained by the following method:

$Pos_{ij}$ indicates whether $Slot(i,j)$ is occupied, being 0 if $Slot(i,j)$ is occupied; otherwise $Pos_{ij}$ being 1; $i \in [1 \ldots m]$, $j \in [1 \ldots n]$; wherein m is the number of slots comprised in the uplink subframe, and n is the number of subchannels comprised in the uplink subframe.

The processing procedure comprises:

if the number of current available slots is no less than that of slots that the terminal needs after repetition, i.e.

$$BW_{repetition} \leq \sum_{i,j} Pos_{ij},$$

slot resource is allocated for the terminal in accordance with symbol time priority manner. Otherwise, the step B is executed.

$N\_Subchannel_{repetition}(i)$ denotes the number of subchannels occupied by the terminal in the $i^{th}$ allocated slot, i.e.

$$N\_Subchannel_{repetition}(i) = \sum_j Pos_{ij};$$

$N\_Subchannel_{repetition}$ denotes the maximum number of subchannels occupied by the terminal in any slot, i.e.:

$N\_Subchannel_{repetition} = Max\{N\_Subchannel_{repetition}(i)\}$.

The present invention will be further illustrated with reference to an application embodiment.

Figure 5:
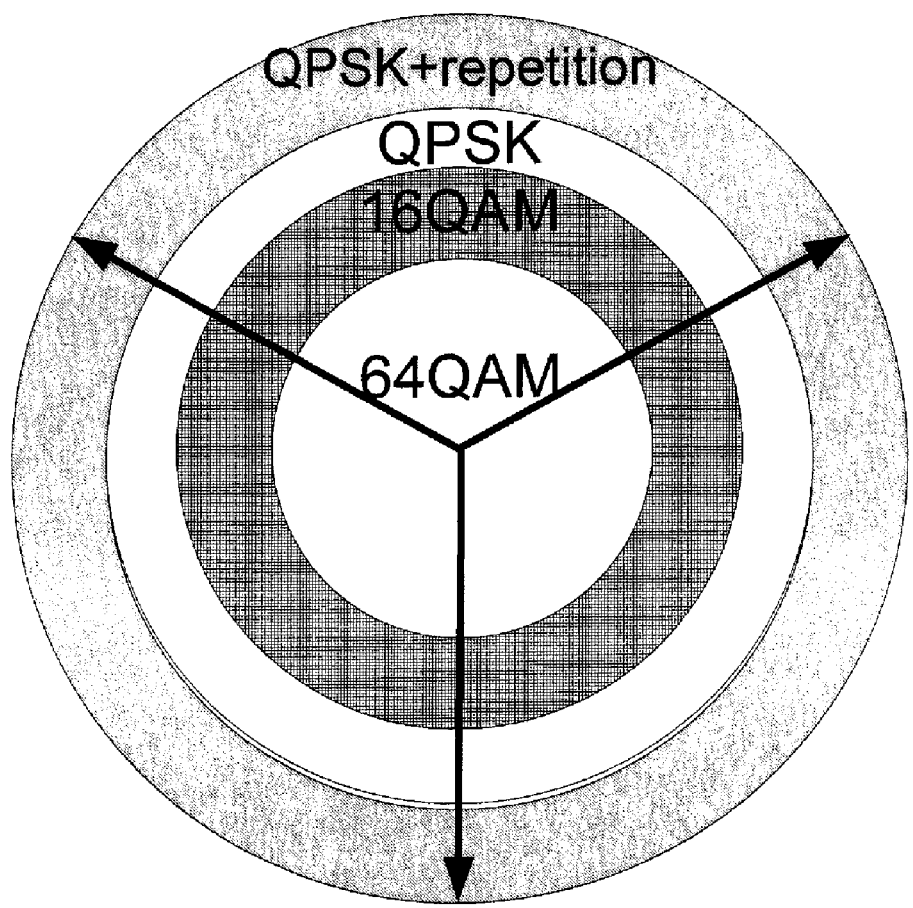
FIG. 5 is a diagram illustrating the reverse coverage of an OFDMA system.

As shown in FIG. 5, which is a diagram illustrating uplink reverse coverage, it can be seen that, with the MS gradually moving from the near base station point to the edge of the base station (as shown in FIG. 5 directions of the arrows), the modulation of the MS will be changed from 64 Quadrature Amplitude Modulation (QAM) to 16QAM, then to Quadrature Phase-Shift Keying (QPSK), and then to QPSK plus $N_{repetition}$ times of repetition, when the MS reaches the edge of QPSK area, the transmit power of the MS will reach the maximum value $P_{max}$, if the MS continues to move outwards, in order to meet the demand of CINR, there are three manners as follows to reach the object of improving reverse gain, i.e. increasing reverse coverage.

Manner 1: repetition is enabled while the Qos requirement of a terminal user is guaranteed, and the transmission speed of the terminal is not changed in this manner.

The characteristic of the manner is that the user's Qos can be guaranteed; more bandwidth is occupied in comparison with that before repetition; repetition judgment is performed according to the above-mentioned method, and there must be reverse gain after repetition is enabled.

Manner 2: repetition is enabled while the total number of subchannels allocated for the terminal is maintained constant, and the transmission speed of the terminal is changed to $1/N_{repetition}$ of that before repetition.

The characteristic of this manner is that the user's Qos cannot be guaranteed; the same bandwidth as that before repetition is occupied; the transmit power of the subchannel is not changed, and interference to adjacent cells is not increased.

Manner 3: the number of subchannels occupied by the terminal is reduced, and the transmit power of each subchannel (sub-carrier) is increased.

The characteristic of this manner is that the user's Qos cannot be guaranteed; more bandwidth is occupied in comparison with that before repetition; the transmit power of the subchannel is increased, and interference to adjacent cells is increased.

To further understand the present invention, the processing procedure of the present invention will be illustrated with reference to an applied embodiment hereinafter.

Step 101: when the CINR demand cannot be met even after the terminal's transmit power has reached the maximum value $P_{max}$, manner 1 is adopted: it is determined whether to enable repetition under the condition that the Qos demand and transmit power of the terminal are maintained, so as to increase reverse coverage ability.

Figure 6:
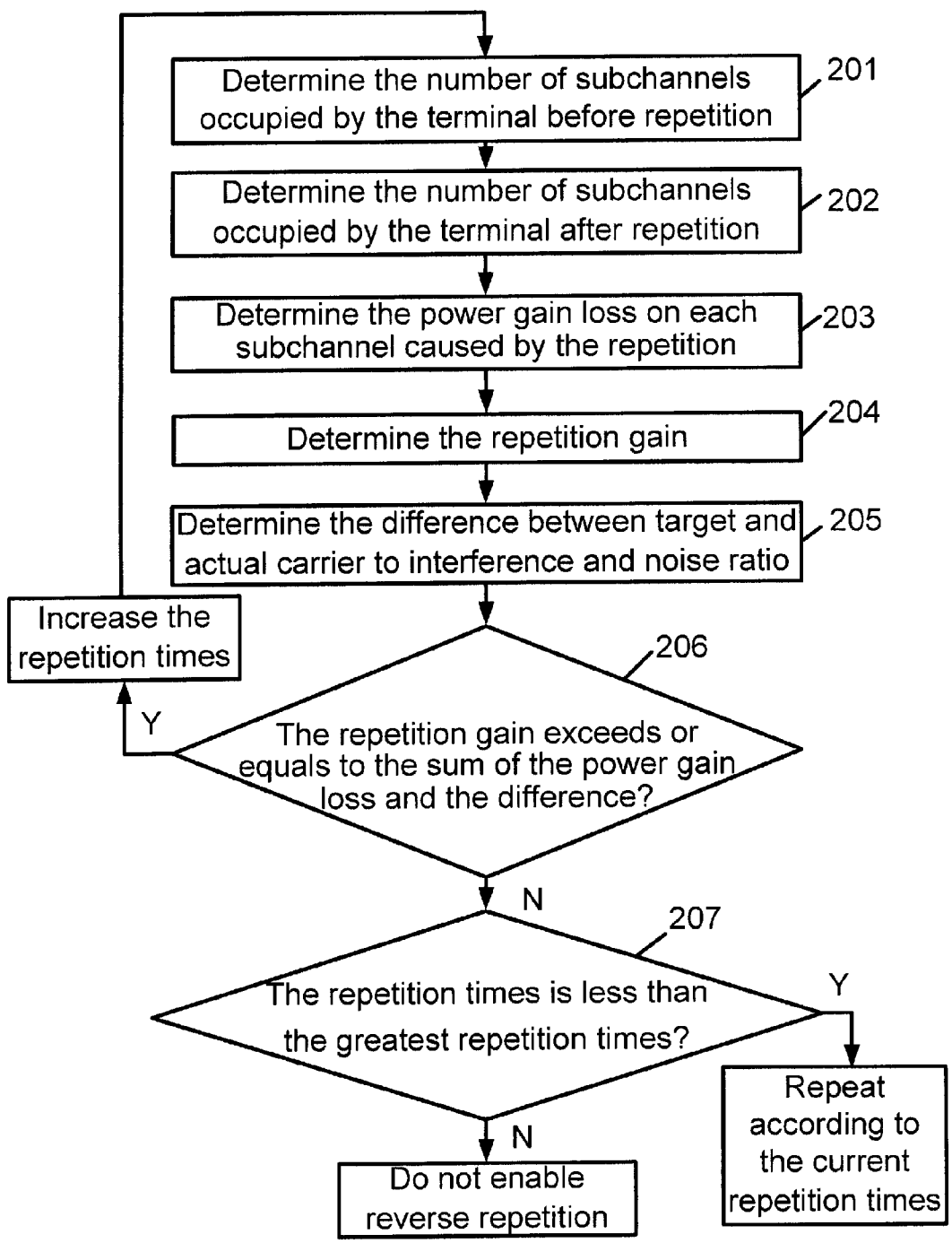
FIG. 6 is a flowchart illustrating an applied embodiment of the present invention.

The step is as shown in FIG. 6, including step 201 to step 206:

step 201: the base station determines the number of subchannels $N\_Subchannel_{Pre\_repetition}$ allocated for the terminal to occupy in the nearest previous frame;

step 202: the base station determines the number of subchannels $N\_Subchannel_{repetition}$ occupied by the terminal after $N_{repetition}$ times of repetition;

step 203: the base station determines the power gain loss $PowerLoss_{subchannel}$ (dB) of each subchannel brought by $N_{repetition}$ times of repetition according to results in step 201 and 202;

step 204: the base station determines the gain $Gain_{N\_repetition}$ after $N_{repetition}$ times of repetition;

step 205: the base station determines the difference value $Delta_{cinr}$ between the target CINR and the current measured CINR; and in practical application, the order of other steps can be exchanged randomly as long as the step 203 is executed after the step 201 and the step 202.

Step 206: according to the results in the step 203 and the step 204, the base station judges whether to repeat and how many times to repeat according to the following judging terms:

if it is satisfied that $Gain_{N\_repetition} \geq PowerLoss_{subchannel} + Delta_{cinr}$, the terminal transmits after $N_{repetition}$ times of repetition; otherwise, step 207 is executed; and step 207: judging whether current repetition times is less than the maximum repetition times, increase the repetition times if yes, and call step 201; otherwise, it means that $N_{repetition}$ times of repetition cannot be enabled under the condition that the Qos requirement and the transmission speed of the terminal are maintained, and call step 102.

Step 102: manner 2 or manner 3 is selected according to the specific strategy of the base station to increase reverse gain.

Figure 7:
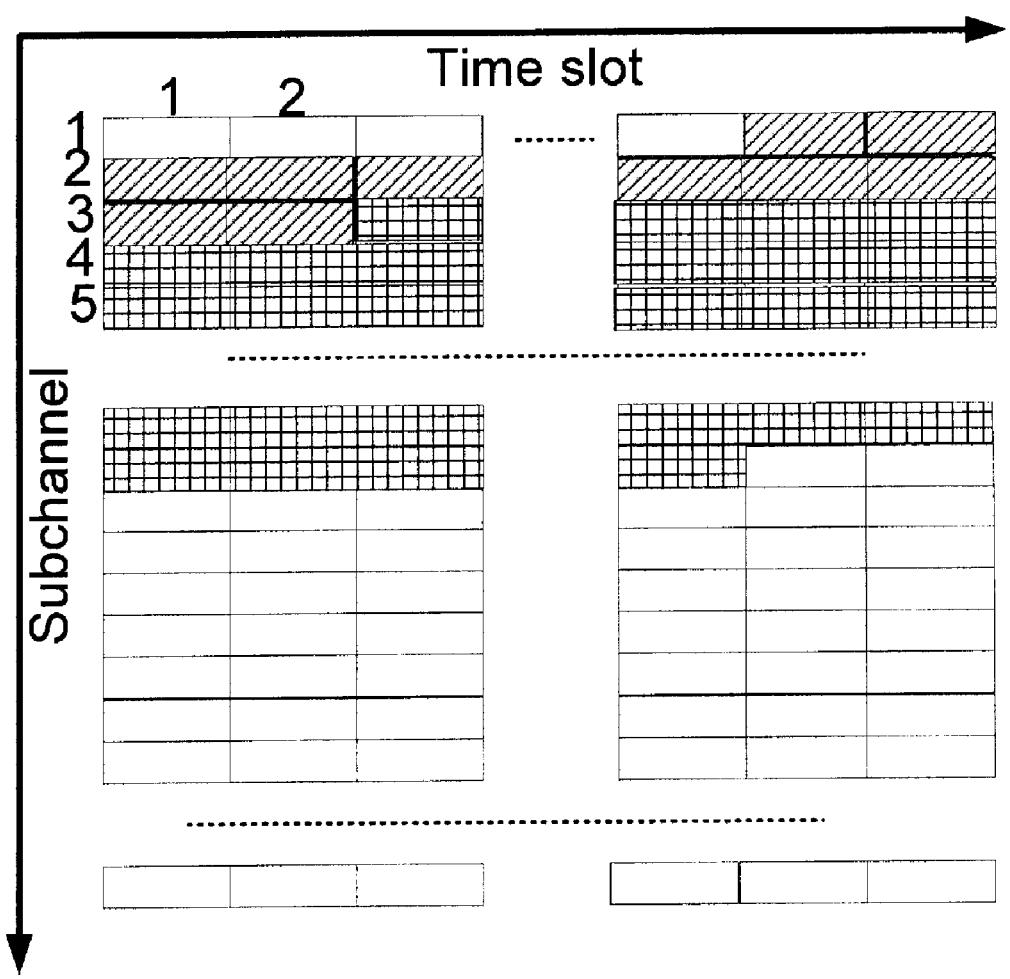
FIG. 7 is a diagram illustrating the logical structure of an OFDMA reverse frame of the present invention.

FIG. 7 is a diagram illustrating the logical structure of an OFDMA reverse frame.

The above content is just a detailed illustration of the present invention with reference to specific Exemplary embodiments, but it should not be hold that the embodiments of the present invention are only limited to the illustration. It should be understood to those skilled in the art that, various simple modifications and equivalent substitutions within the spirit of the present invention can be made, and are all in the protection scope of the present invention.

INDUSTRIAL APPLICABILITY

The method of the present invention can take account of subchannel gain, repetition gain and the interaction of both as an integration, to ensure that the whole gain of reverse link increases after the enabled repetition, and to prevent the system from sacrificing bandwidth without improving but deteriorating the reverse coverage ability in certain circumstances after the enabled repetition occurs.

What is claimed is:

1. A method for improving reverse gain, the method being applied in an Orthogonal Frequency Division Multiple Access system, comprising:
   step A, determining by a base station whether a reverse reception performance demand can be met without a reverse repetition,
      if said determining step determines that the reverse reception performance demand cannot be met without a reverse repetition then executing step B without changing a service quality requirement and a transmission speed of a terminal; and
   step B, further determining by the base station whether the reverse gain can be improved using the reverse repetition,
      if the base station determines in said further determining step that the reverse gain still cannot be improved by the reverse repetition then notifying the terminal by the base station not to enable the reverse repetition;
      otherwise, notifying the terminal by the base station to enable the reverse repetition.

2. The method according to claim 1, wherein, the step B further comprises:
   calculating the gain of the enabled reverse repetition $Gain_{N\_repetition}$ and a power loss of each subchannel $PowerLoss_{subchannel}$ resulting from the enabled reverse repetition respectively,
      when the gain of the enabled reverse repetition $Gain_{N\_repetition}$ is larger than the power loss of each subchannel $PowerLoss_{subchannel}$ resulting from the enabled reverse repetition, the reverse repetition is enabled,
      otherwise, the reverse repetition is not enabled.

3. The method according to claim 1, wherein the step B further comprises:
   if the reverse gain still is not improved after a maximum repetition times of repetition, then the reverse repetition is not enabled;
   otherwise the base station determines a minimum repetition times after which the reverse gain is improved, and notifies the terminal to repeat for the repetition times and then transmit reversely.

4. The method according to claim 3, wherein the step B further comprises:
   step B1, setting the initial value of repetition times $N_{repetition}$ to be 2;
   step B2, determining by the base station a power gain loss of each subchannel $PowerLoss_{subchannel}$ after $N_{repetition}$ times of repetition as well as an acquired gain $Gain_{N\_repetition}$ after $N_{repetition}$ times of repetition;

step B3, determining by the base station a difference value $Delta_{cinr}$ between a target carrier-to-interference-and-noise ratio (CINR) and a current measured CINR;
   step B4, if $Gain_{N\_repetition} \geq PowerLoss_{subchannel}+Delta_{cinr}$ then the base station notifies the terminal to repeat for $N_{repetition}$ times and then transmit reversely; and
      otherwise, the base station determining whether $N_{repetition}$ is less than the maximum repetition times, and
   increasing $N_{repetition}$ if it is less than the maximum repetition times and then repeat the steps B2 to B4;
   otherwise, the reverse repetition is not enabled.

5. The method according to claim 2, wherein:

$$PowerLoss_{subchannel}=10\log_{10}(N\_Subchannel_{repetition}/N\_Subchannel_{Pre\_repetition})$$

wherein,
$N\_Subchannel_{Pre\_repetition}$ is a number of subchannels occupied by the terminal before $N_{repetition}$ times of repetition,
while $N\_Subchannel_{repetition}$ is a number of subchannels occupied by the terminal after $N_{repetition}$ times of repetition.

6. The method according to claim 2, wherein:

$$Gain_{N\_repetition}=10\log_{10}^{Nrepetition}.$$

7. The method according to claim 4, wherein:

$$Delta_{cinr}=CINR_{Target}-CINR_{temp}.$$

8. The method according to claim 5, wherein:
$N\_Subchannel_{Pre\_repetition}$ is a number of subchannels allocated for the terminal in a previous nearest frame;
$N\_Subchannel_{repetition}$ is a number of subchannels occupied by a bandwidth that the terminal requires currently after $N_{repetition}$ times of repetition.

9. The method according to claim 8, wherein, $N\_Subchannel_{Pre\_repetition}$ is determined by the following ways according to different situations respectively:
   (91), after disregarding an overhead channel, when numbers of slots of each subchannel in an uplink subframe are the same:

$$N\_Subchannel_{Pre\_repetition} = Ceil\left[\frac{BW_{Pre\_repetition}}{T_{slot\_per\_subchannel}}\right]$$

wherein,
$T_{slot\_per\_subchannel}$ is a number of total available uplink slots of each subchannel allocated by the base station for the terminal,
$BW_{Pre\_repetition}$ is the total reverse bandwidth of the last frame which is nearest to a current frame;
Ceil[ ] is to round up; and
(92), after disregarding the overhead channel, when numbers of slots of each subchannel in the uplink subframe are not all the same:
$N\_Subchannel_{Pre\_repetition}$ is a maximum number of subchannels occupied by the terminal of any slot in a previous subframe which is nearest to a current frame.

10. The method according to claim 8, wherein, the $N\_Subchannel_{repetition}$ is determined by the following ways according to different situations respectively:
   (101), after disregarding an overhead channel, when numbers of slots of each subchannel in an uplink subframe are the same:

$$N\_Subchannel_{repetition} = Ceil\left[\frac{BW_{repetition}}{T_{slot\_per\_subchannel}}\right]$$

wherein, $T_{slot\_per\_subchannel}$ is a number of total available uplink slots of each subchannel;

$BW_{repetition}$ is a number of reverse general bandwidth slots occupied by the terminal after $N_{repetition}$ times of repetition;

Ceil[ ] is to round up; and (102), after disregarding the overhead channel, when numbers of slots of each subchannel in the uplink subframe are not all the same:

if a number of available slots is less than a number of needed slots after repetition, the reverse repetition is not enabled;

otherwise, $N\_Subchannel_{repetition}$ is a maximum number of subchannels occupied by the terminal of any slot in the uplink subframe.

11. The method according to claim 1, wherein, in the step B, when the reverse repetition is not enabled, executing step C:

step C, the base station notifies the terminal:

to repeat while maintaining the number of subchannels occupied by the terminal before the reverse transmission, or to reduce the number of subchannels occupied by the terminal and increase the transmit power of each subchannel before the reverse transmission.

12. The method according to claim 11, wherein, the step A further comprises:

step A1, determining if CINR demand can be met with the terminal's reverse transmit power at an adjustable maximum value $P_{MAX}$, when the CINR demand cannot be met even if the terminal's reverse transmit power reaches the adjustable maximum value $P_{max}$, executing step A2;

step A2, determining by the base station whether the CINR demand can be met under a current distribution condition firstly:

under a condition that a terminal service quality requirement and the transmission speed are consistent and after confirming that the terminal's demand for transmission channel is satisfied, the base station determines the power gain change at every subchannel;

executing the step C if the terminal's demand for transmission channel is not satisfied;

if the CINR demand can be met after the subchannel power gain is changed, the repetition is not enabled, setting the repetition times $N_{repetition}$ to be 1 and then notifying the terminal to transmit reversely accordingly; and otherwise, if the CINR demand cannot be met after the subchannel power gain is changed, executing the step B.

13. The method according to claim 4, wherein:

$PowerLoss_{subchannel} = 10 \log_{10}(N\_Subchannel_{repetition}/N\_Subchannel_{Pre\_repetition})$ wherein, $N\_Subchannel_{Pre\_repetition}$ is a number of subchannels occupied by the terminal before $N_{repetition}$ times of repetition, while $N\_Subchannel_{repetition}$ is a number of subchannels occupied by the terminal after $N_{repetition}$ times of repetition.

14. The method according to claim 4, wherein:

$Gain_{N\_repetition} = 10 \log_{10}{N_{repetition}}$.

15. The method according to claim 13, wherein:

$N\_Subchannel_{Pre\_repetition}$ is a number of subchannels allocated for the terminal in a previous nearest frame;

$N\_Subchannel_{repetition}$ is a number of subchannels occupied by a bandwidth that the terminal requires currently after $N_{repetition}$ times of repetition.

16. The method according to claim 15, wherein, $N\_Subchannel_{Pre\_repetition}$ is determined by the following ways according to different situations respectively:

(91), after disregarding an overhead channel, when numbers of slots of each subchannel in an uplink subframe are the same:

$$N\_Subchannel_{Pre\_repetition} = Ceil\left[\frac{BW_{Pre\_repetition}}{T_{slot\_per\_subchannel}}\right]$$

wherein, $T_{slot\_per\_subchannel}$ is a number of total available uplink slots of each subchannel allocated by the base station for the terminal, $BW_{Pre\_repetition}$ is a total reverse bandwidth of a last frame which is a nearest to a current frame;

Ceil[ ] is to round up; and (92), after disregarding the overhead channel, when numbers of slots of each subchannel in the uplink subframe are not all the same:

$N\_Subchannel_{Pre\_repetition}$ is the maximum number of subchannels occupied by the terminal of any slot in the previous subframe which is the nearest to the current frame.

17. The method according to claim 15, wherein, the $N\_Subchannel_{repetition}$ is determined by the following ways according to different situations respectively:

(101), after disregarding an overhead channel, when numbers of slots of each subchannel in an uplink subframe are the same:

$$N\_Subchannel_{repetition} = Ceil\left[\frac{BW_{repetition}}{T_{slot\_per\_subchannel}}\right]$$

wherein, $T_{slot\_per\_subchannel}$ is a number of total available uplink slots of each subchannel;

$BW_{repetition}$ is a number of reverse general bandwidth slots occupied by the terminal after $N_{repetition}$ times of repetition;

Ceil[ ] is to round up; and (102), after disregarding the overhead channel, when numbers of slots of each subchannel in the uplink subframe are not all the same, if a number of available slots is less than a number of needed slots after repetition, the reverse repetition is not enabled;

otherwise, $N\_Subchannel_{repetition}$ is a maximum number of subchannels occupied by the terminal of any slot in the uplink subframe.

* * * * *